United States Patent [19]
Nigrelli et al.

[11] Patent Number: 5,011,372
[45] Date of Patent: * Apr. 30, 1991

[54] AERATION APPARATUS FOR POND

[75] Inventors: Nicholas B. Nigrelli, Cleveland; David Wasmer, Newton, both of Wis.

[73] Assignee: Nigrelli Systems, Inc., Kiel, Wis.

[ * ] Notice: The portion of the term of this patent subsequent to May 22, 2007 has been disclaimed.

[21] Appl. No.: 450,426

[22] Filed: Dec. 14, 1989

[51] Int. Cl.$^5$ .............................................. F01D 9/02
[52] U.S. Cl. ..................... 415/211.2; 415/7; 415/146; 416/85; 239/23; 239/552
[58] Field of Search ............... 415/7, 146, 147, 208.1, 415/211.2; 416/84, 85, 86; 239/22, 23, 514, 550, 552, 596; 417/61, 423.3, 423.6, 423.14, 424.1, 424.2, 430; 261/79, 34.1, 91

[56] References Cited

U.S. PATENT DOCUMENTS 3,101,173  8/1963  Jennings ................................. 239/23
3,706,415  12/1972  Hruby, Jr. ............................. 239/552

OTHER PUBLICATIONS

Application Ser. No. 333,267, file date 4/05/89, Applicant: Nicholas B. Nigrelli.

Primary Examiner—John T. Kwon
Attorney, Agent, or Firm—Fuller, Ryan & Hohenfeldt

[57] ABSTRACT

A high volume aeration device comprises a motor and propeller tube suspended in a pond by a float. A propeller on the motor shaft and inside the propeller tube creates a generally hollow water output stream that rises out of the propeller tube. A diffuser plate is longitudinally slidable inside the hollow water output stream. The water output stream strikes the diffuser plate and locates it at an equilibrium location whereat the force of the water output stream on the diffuser plate periphery equals the weight of the diffuser plate. If the propeller cavitates, the reduced water output stream causes the diffuser plate to fall toward the propeller and redirect the water output stream to the propeller. The redirected water output stream reloads the propeller and enables the aeration device to resume full output without outside intervention after the cause of the cavitation has been eliminated. The aeration device further comprises a weed guard that prevents motor shaft entanglement with weeds or the like, and a perforated cap that directs the water output stream into a high vertical column having a predetermined pattern.

22 Claims, 4 Drawing Sheets

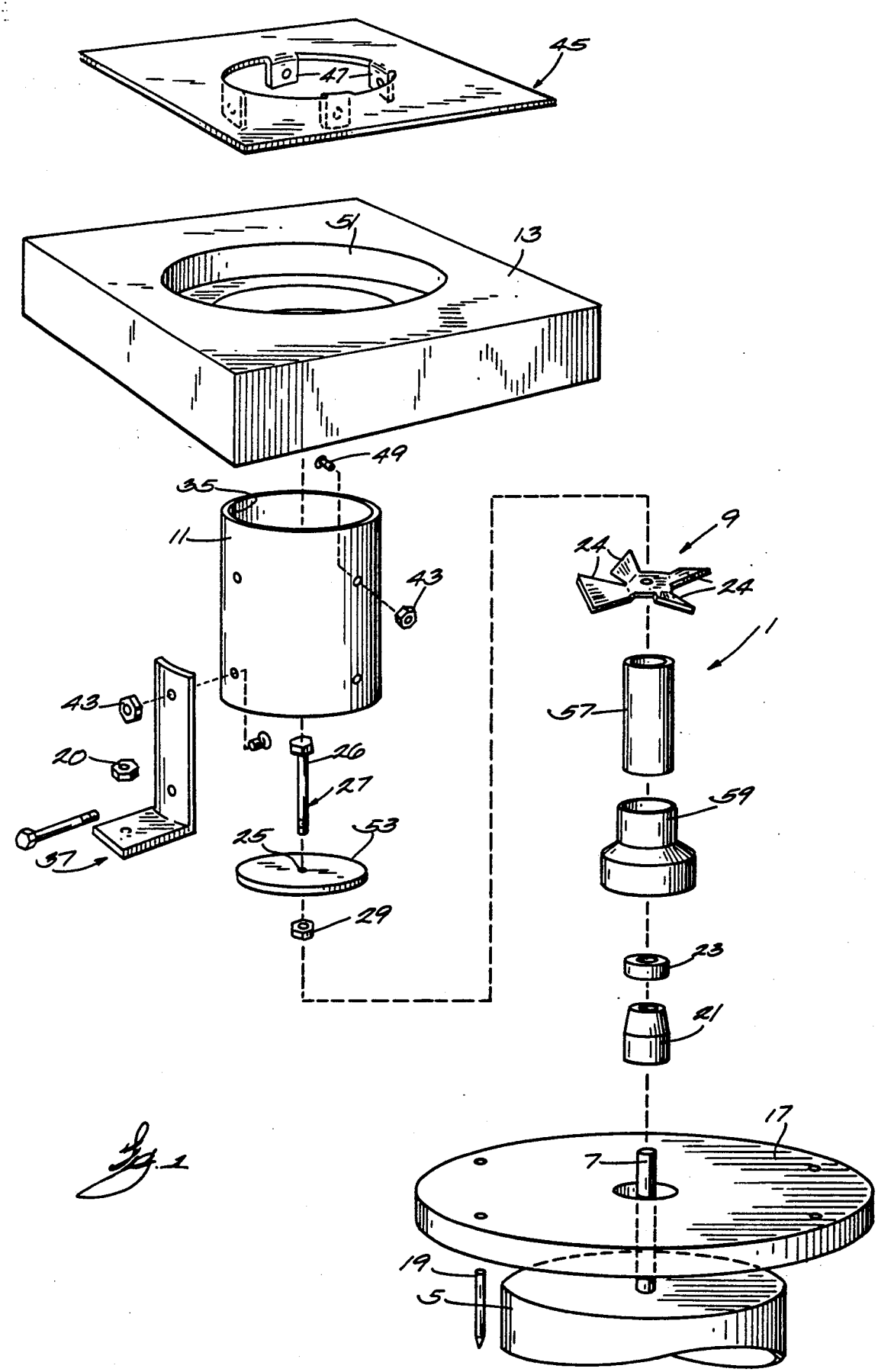

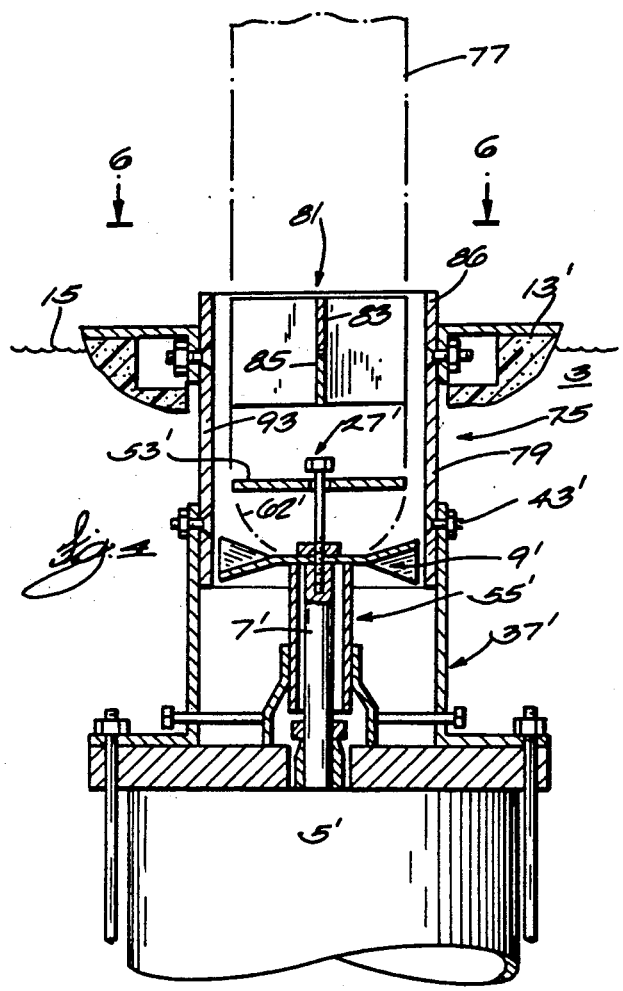
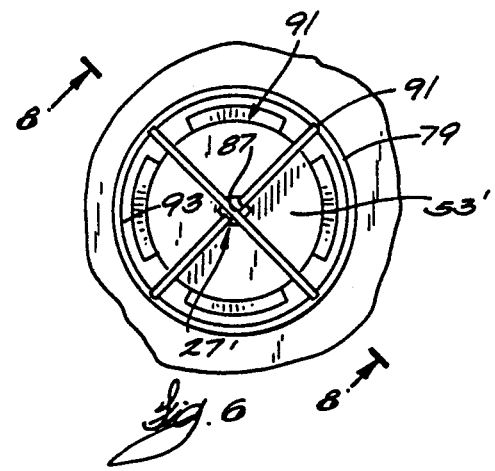
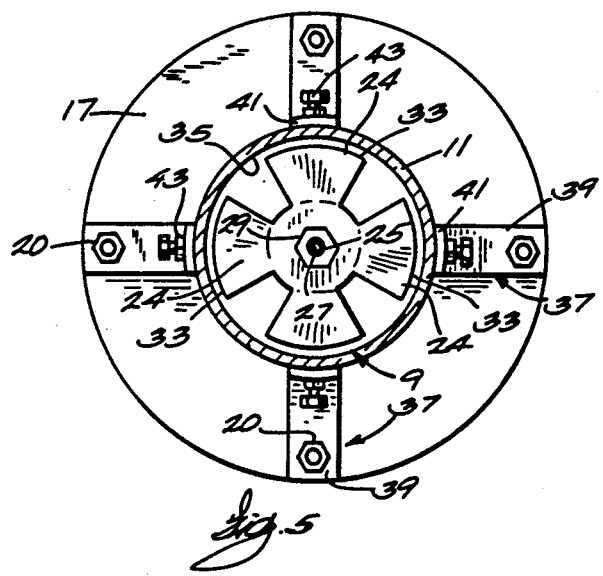
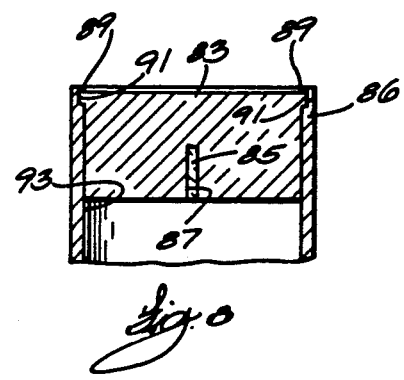

AERATION APPARATUS FOR POND

BACKGROUND OF THE INVENTION

1. Field of the Invention

This invention pertains to fluid pumps, and more particularly to apparatus for circulating water.

2. Description of the Prior Art

Water aeration is a common practice. For example, it is known to pump water from a pond or lagoon generally vertically into the air. As the water falls back to the pond, it forms a spray of droplets that absorb oxygen. This practice helps keep the pond high in dissolved oxygen, which is especially beneficial to industry and municipalities for aerobic water and sewage treatment processes. In addition to performing a biological function, a column or fountain of water also has high aesthetic appeal. For those reasons, many parks and commercial buildings are landscaped with ponds having water fountains.

Some prior water aerators employ centrifugal pumps to pump the water into the air above the pond. The centrifugal pump is usually mounted to a block of low density material, such that the block floats at or near the water surface with the pump extending below the block. An electric motor is mounted to the pump. The pump outlet is substantially vertical to force the water into the air. Although centrifugal pumps can produce relatively high pressures, their output volumes are relatively low. When used as aerators, centrifugal pumps can produce decorative patterns, but only at low volumes. Low volume is a major disadvantage of centrifugal pumps. In addition, centrifugal pump aerators are undesirably expensive and heavy.

Another serious problem with centrifugal aerators is that they are very susceptible to failed operation due to cavitation. Once the pump impeller cavitates, the output flow reduces to a negligible amount. It is a characteristic of the pump that it cannot recover to properly discharge water again after the cause of cavitation is eliminated unless the motor is stopped and restarted.

Another common design of water aerator utilizes a propeller mounted to an electric motor shaft. The electric motor and propeller are usually mounted to a float device that suspends the propeller a few inches below the water surface. Prior propeller type aerators are relatively inexpensive and compact, and they are capable of pumping greater quantities of water than centrifugal pumps. However, propeller type aerators suffer the major handicap of being unable to impart a high velocity to the pumped water. Any attempt to increase the velocity of the water leaving the propeller by means of a nozzle or similar restrictor causes a back pressure on the propeller and a drastic decrease in flow, so the water output stream collapses to a dribble. Consequently, prior propeller type aerators cannot produce the decorative patterns of centrifugal pump aerators. For instance, because the propeller aerator cannot produce a high vertical column of water, a cone-shaped deflector is often located in the water output stream. Water striking the deflector is diverted into a high volume umbrella-shaped pattern but having only a low height. Also, like centrifugal pump aerators, propeller type aerators are very susceptible to failure due to cavitation. Should cavitation occur, the aerator must be stopped and then restarted.

Some prior water aerators suffer a further handicap, which concerns fouling due to weeds and other water-borne debris entering the equipment. Screens and strainers are commonly used to filter most of the contaminants from the incoming water. However, the screens must be cleaned periodically, which results in undesirable maintenance costs. Some aerators are designed with screens protecting only the impeller or propeller, with the motor shaft remaining exposed. As a result, even if the impeller or propeller is protected, weeds and the like can wrap around the motor shaft, thereby adversely affecting performance. Ultimately, the aerator must be shut down for cleaning. It is also known to provide aerators with knives for cutting the weeds, but knives present potentially serious safety problems. The foregoing deficiencies of prior aerators have been overcome to a large extent by the aeration device described in co-pending U.S. patent application Ser. No. 333,267. However, the present invention represents further improvements in water aeration devices.

SUMMARY OF THE INVENTION

In accordance with the present invention, a simple and inexpensive propeller type water aerator is provided that is capable of pumping greater volumes of water and at higher velocities than was previously possible. This is accomplished by apparatus that includes a diffuser plate located in the water output stream of the aerator propeller.

The propeller of the water aerator is mounted to the shaft of a vertically oriented submersible electric motor. The diffuser plate consists of a thin disk having a central hole that freely slides along a longitudinal extension of the motor shaft on the downstream side of the propeller. The motor shaft extension may be the shape of a screw that is partially threaded into an axially tapped hole in the end face of the motor shaft. Propeller mounting to the motor shaft may be by a nut threaded unto the screw, with the propeller sandwiched between the nut and the motor shaft. The diffuser plate is slidable along the screw shank between the nut and the screw head. If desired, sliding of the diffuser plate on the screw may be limited by a stop installed on the screw shank between the nut and the screw head.

Surrounding the propeller and diffuser plate is a propeller tube. One end of the propeller tube is spaced several inches from the electric motor end plate. Preferably, the tube second end extends a little more than two inches beyond the head of the propeller mounting screw. The propeller tube is preferably circular, with the inner diameter thereof being dimensioned so as to provide minimum clearance with the peripheries of the propeller blades.

As the propeller rotates, water is drawn into the propeller tube between the first end thereof and the motor end plate. The propeller flings the water tangentially and radially outwardly against the propeller tube. The propeller tube converts the radial component of motion of water into a longitudinal component. As a result, the water output stream travels upwardly with a helical motion within the tube. Further, the water output stream acquires a hollow columnar configuration, with the interior surface of the water column having a generally parabolic cross section.

Under normal conditions, the helically flowing water forces the diffuser plate to slide upwardly along the screw shank until the diffuser plate periphery is generally coincident with the parabolic interior surface of the hollow water column. The diffuser plate is maintained at that position under the opposing forces of gravity and the flowing water striking the diffuser plate periphery. By varying the diameter of the diffuser plate, the volume of the water output stream can also be varied, with a smaller diffuser plate resulting in increased output flow.

The diffuser plate performs the very important function of enabling a cavitated propeller to automatically recover after the cause of cavitation has been eliminated. When the propeller cavitates, its output drops drastically. Consequently, the upward force on the diffuser plate is greatly reduced, and gravity forces the diffuser plate close to the propeller. The little water normally discharged from the propeller, even after the cause of the cavitation has been eliminated, strikes the diffuser plate and deflects the water back to the propeller. The deflected water acts to reload or reprime the propeller. As a result, the propeller is able to quickly recover and resume its normal output without external intervention.

The aerator motor shaft is not vulnerable to damage or failed performance because of entanglement with foreign matter. That is because the shaft is surrounded by a weed guard that is stationarily mounted to the motor end plate. Since the motor shaft is not exposed to the surrounding regions of a pond or similar body of water, weeds and similar matter cannot become entangled on the shaft.

It is a feature of the present invention that it can pump water high into the air in a manner previously possible only with centrifugal pump aerators. Such performance is possible by the use of a perforated cap at the downstream end of the propeller tube. The cap acts to block the tangential motion of the water flowing out of the propeller tube, so that the water output stream leaving the propeller tube has only a longitudinal component of motion. Consequently, the entire velocity of the water output from the pump is directed vertically upwardly to create a high column of water that has a high capacity for aerating the water. The cap is further designed to direct the aerator water output into a decorative pattern. Different patterns are obtained by varying the arrangement of the cap perforations. The perforated cap enables the output water to reach greater heights than is possible with prior aerators with only a slight reduction in volume.

Other objects and advantages of the invention will become apparent to those skilled in the art upon reading the disclosure.

BRIEF DESCRIPTION OF THE DRAWINGS

FIG. 4 is a view similar to FIG. 3 but showing a modified embodiment of the aeration device.

FIG. 5 is a cross-sectional view taken along lines 5—5 of FIG. 2.

FIG. 6 is a view taken along lines 6—6 of FIG. 4.

FIG. 7 is a view similar to FIG. 3, but showing the aeration device in operation with a greatly reduced water output flow.

FIG. 8 is a cross-sectional view taken along lines 8—8 of FIG. 6.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 2:
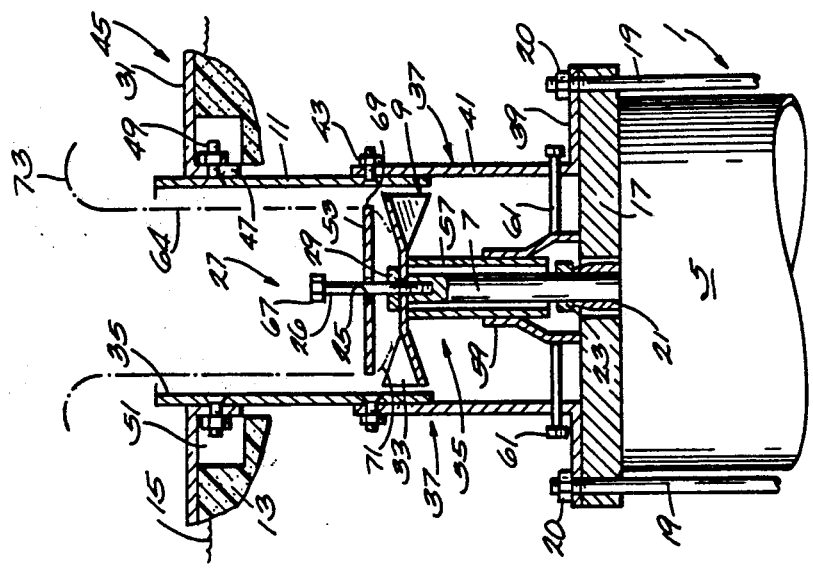
FIG. 2 is a longitudinal cross-sectional view showing the aeration device in an inoperative mode.
Figure 1:
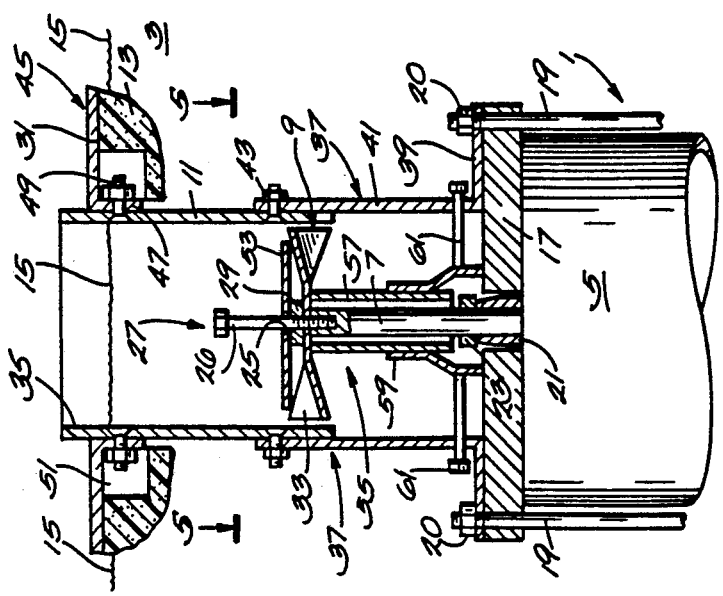
FIG. 1 is an exploded view of the aeration device.

Referring to FIGS. 1, 2, and 5, an aeration device 1 is illustrated that is particularly useful for enhancing the aesthetics of an outdoor pond or other body of water 3. The invention is also very useful for the aerobic treatment of poor quality water.

Generally, the aeration device 1 comprises an electric motor 5 having an output shaft 7. A propeller 9 is mounted to the end of the motor shaft 7. A propeller tube 11 is fastened to the motor 5 and surrounds the propeller 9. The propeller tube 11 is connected to a low density float 13. The aeration device is designed such that when it is placed in the pond 3, it submerges to the point where the float top surface 31 is approximately coplanar or slightly above the water surface 15.

The electric motor 5 may be generally conventional. The particular motor shown includes an end plate 17 and tie rods 19 with nuts 20. A seal 21 is retained on the motor shaft 7 by a collar 23. The propeller 9 may have three blades 24, as is best shown in FIG. 5. The propeller defines an axial hole that receives a motor shaft extension, which may be a long screw 27. The screw 27 is partially threaded into the end face of the motor shaft. A nut 29 threaded on the screw firmly mounts the propeller on the motor shaft. To provide maximum efficiency to the aeration device, the propeller tube 11 is circular in cross section, and the peripheries 33 of the propeller blades 24 are spaced with minimum clearance to the inner surface 35 of the propeller tube.

In the illustrated construction, the propeller tube 11 is fastened to the motor 5 by four angle brackets 37. Each bracket 37 has a first leg 39 that is placed against the motor plate 17, where it may be fixed by a tie rod 19 and nut 20. The lower end of the propeller tube is joined to the second legs 41 of the brackets 37 by screws and nuts 43. The upper end of the propeller tube is connected to the float 13 by a float mounting plate 45. The float mounting plate 45 includes two or more downwardly facing lugs 47. The lugs 47 cooperate with screws and nuts 49 to connect the propeller tube to the float mounting plate. To provide clearance for the screws and nuts 49, the float is fabricated with an annular groove 51. Alternately, clearance for the screws and nuts 49 may be provided by individual pockets formed in the float.

The aeration device 1 further comprises a diffuser plate 53. The diffuser plate 53 is formed as a thin disk having a central hole 25 that slides freely along the shank 26 of the screw 27. The diameter of the diffuser plate is preferably about 75% of the diameter of the propeller blades 24. However, the diffuser plate diameter may be varied to produce particular desired operating characteristics in the aeration device.

The motor shaft 7 is protected against entanglement with weeds and other underwater debris by a weed guard 55. The weed guard 55 comprises an upper tube 57 that surrounds the major portion of the motor shaft.

The upper tube 57 is received within and is held in place by a support tube 59. The support tube 59 rests on the motor plate 17 and is centered over the motor shaft by a series of long screws 61. A screw 61 is threaded into each bracket 37. The ends of the respective screws bear against the support tube 59 for adjustably maintaining its position over the motor shaft.

In the inoperative mode, the aeration device 1 is in the configuration shown in FIG. 2. The motor shaft 7 and propeller 9 are stationary. The diffuser plate 53 rests by gravity on the nut 29. Alternately, a separate stop, such as a washer, not shown, may be installed on the screw 27 above the nut 29 for supporting the diffuser plate in the inoperative mode. The pond surface 15 is continuous across the interior of the propeller tube 11.

When the motor 5 is energized, the motor shaft 7 and propeller 9 rotate to create a water output stream. See FIG. 3. Water in the pond 3 is drawn by the propeller in the direction of arrows 60 past the brackets 37 and upwardly through the propeller. The propeller imparts radial and tangential components of motion to the water, thereby slinging the water outwardly and causing the water to strike the inner surface 35 of the propeller tube 11. At the propeller tube surface 35, the radial component of motion is replaced by a longitudinal component in the upward direction, as is depicted by arrow 63. As a consequence, the water travels in a generally helical path inside the propeller tube. Further, the water forms a generally hollow column 64 having a generally parabolic surface 62 that surrounds the hollow interior 65. The diffuser plate 53 is designed such that the water leaving the propeller forces the diffuser plate upwardly on the shank 26 of the screw 27 toward the screw head 67. With the aeration device operating normally, the periphery 69 of the diffuser plate is supported by the water output stream just at the parabolic surface 62 and at a location in contact with or slightly spaced from the screw head 67.

When the water column 64 emerges from the top of the propeller tube 11, its combined upward and tangential components of motion cause the water to form a full and pleasing umbrella or fountain spray pattern 66. As the water droplets pass through the atmosphere before falling back to the pond 3, they absorb oxygen as well as provide aesthetic appeal. The weed guard 55 enables the aeration device 1 to be operated indefinitely without fouling of the motor shaft 7 by weeds or other materials borne by the incoming water 60.

The aeration device 1 is capable of spraying and aerating quantities of water far in excess of prior centrifugal type aerators. In fact, the aeration device of the present invention has a capacity generally equal to or greater than propeller pump aerators of similar size.

Figure 3:
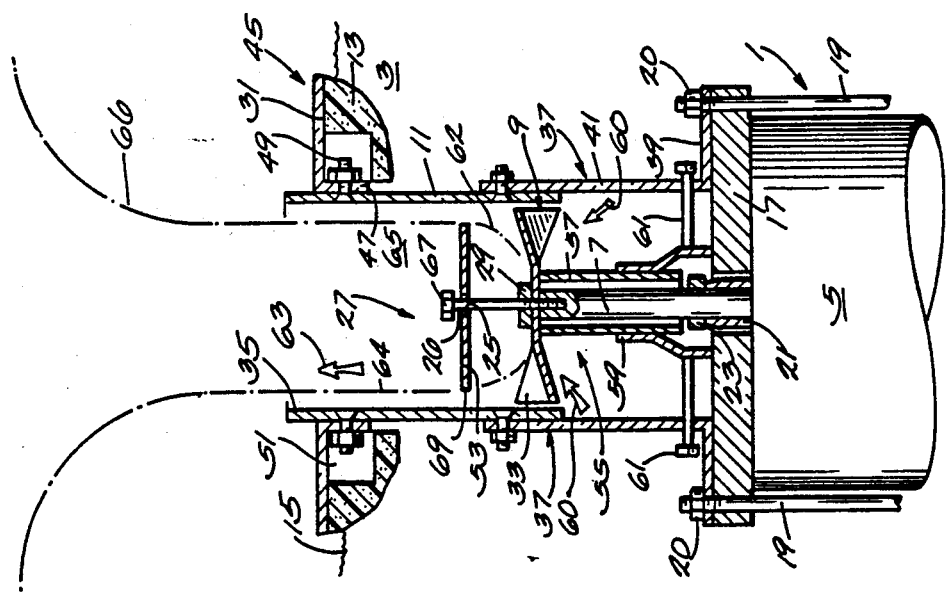
FIG. 3 is a cross-sectional view similar to FIG. 2, but showing the aeration device in an operative mode.

Should the propeller 9 begin to cavitate, the output stream 64 diminishes greatly and the parabolic water surface 62 acquires a much flatter shape, as, for example, the surface shape 71 of FIG. 7. When that occurs, the output water pattern 73 is weak and unattractive. The output stream is unable to support the diffuser plate 53 at a location high on the shank 26 of the screw 27. Accordingly, the diffuser plate falls downwardly by gravity until it again reaches an equilibrium location where the support force of the output water at surface 71 equals the weight of the diffuser plate. In the new location of FIG. 7, practically all of the output water stream is deflected directly back to the propeller, thereby reloading or repriming the propeller. The result is that, after the cause of the cavitation has been eliminated, water again completely surrounds the propeller and full propeller output is resumed, as is shown in FIG. 3. Resumption of full aeration device output is achieved quickly and automatically without requiring that the aeration device 1 be manually shut down and restarted.

A high volume output pattern other than the umbrella pattern 66 can be produced. Turning to FIGS. 4, 6, and 8, a modified aeration device 75 is depicted that is capable of shooting a column of water 77 vertically skyward above the pond 3. The aeration device 75 includes a conventional motor 5' with shaft 7', propeller 9', float 13', screw 27', brackets 37', diffuser plate 53', and weed guard 55'. The aeration device 75 further includes a propeller tube 79 joined to the brackets 37' by screws and nuts 43'.

In operation, the propeller 9' of the aeration device 75 flings water against the propeller tube 79 and into a hollow columnar output stream having an inner parabolic surface 62'. To produce the vertical column 77, the aeration device 75 comprises a cross hatch 81. The cross hatch 81 may be formed as a pair of thin plates 83 and 85 that extend diametrically across the upper or output end 86 of the propeller tube 79. A single plate may be used if desired, but better performance is achieved with two plates. The plates 83 and 85 may define respective notches 87 for mutual interfitting. The plates may be mounted to the propeller tube 79 in any suitable manner, as, for example, by forming them with bent-over flanges and screwing the flanges to the inner surface 93 of the propeller tube. In the construction shown, the plates are provided with respective short tabs 89 that tightly fit into corresponding slots 91 in the propeller inner surface 93.

The cross hatch 81 functions to block the tangential component of motion of the water output stream leaving the propeller 9' and moving upwardly in a helical pattern inside the propeller tube 79. When the water output stream strikes the cross hatch, the water tangential component of motion is converted into a vertical component, thereby directing the water into the vertical column 77. The aeration device 75 is capable of producing a water column having a volume and height previously obtainable only by a centrifugal pump. The operation of the diffuser plate 53' as it slides up and down the screw 27' in response to variations in the output of the propeller 9' is identical to that described in conjunction with the aeration device 1.

Figure 9:
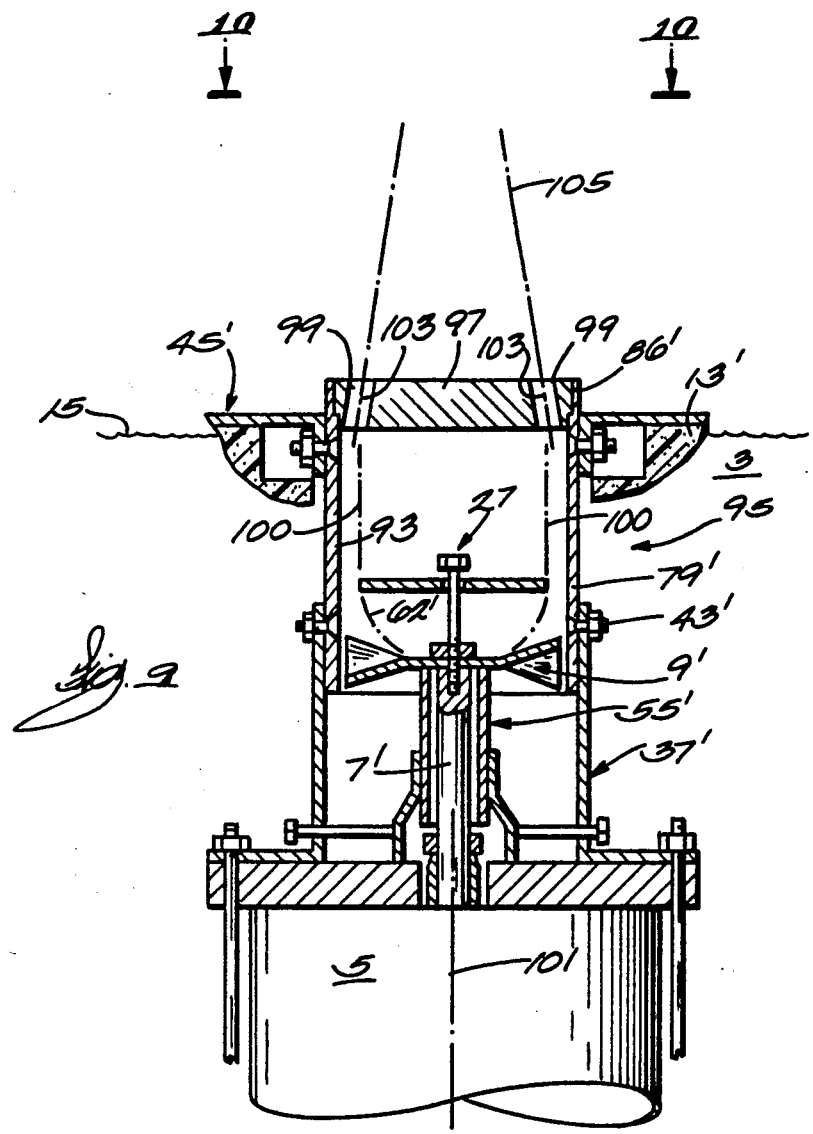
FIG. 9 is a cross-sectional view of the aeration device with a perforated cap at the downstream end of the propeller tube.
Figure 10:
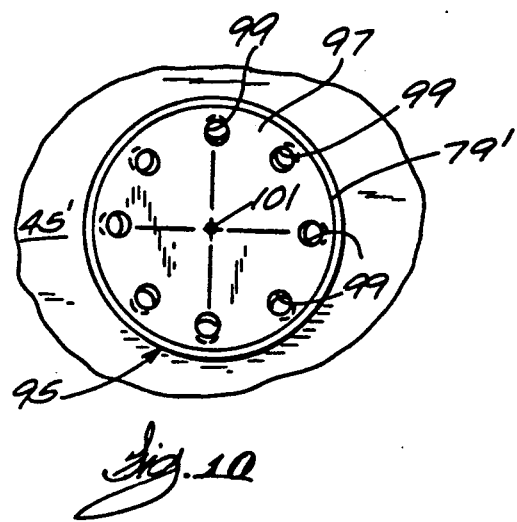
FIG. 10 is a view taken along lines 10—10 of FIG. 9.

In accordance with the present invention, in some applications better results are obtained by replacing the cross hatch 81 with a perforated cap. Referring to FIGS. 9 and 10, an aeration device 95 is illustrated that comprises a cap 97 mounted to the outlet end 86' of the propeller tube 79'. The cap 97 has a series of longitudinally extending openings 99 through which the water 100 from the propeller 9' is directed. In FIGS. 9 and 10, the openings 99 are in the form of round holes arranged in a circle about the central axis 101 of the aeration device 95. The axes 103 of the holes 99 converge upwardly toward the aerator axis 101. A typical cap has a thickness of approximately 0.75 inches with eight holes of approximately 0.63 inches diameter and with an angle of convergence of the axes 103 with the central axis 101 of approximately 5°.

The cap 97 produces a particular decorative pattern to the water output column 105. By varying the size, number, location, and convergence angle of the holes 99, different output patterns are possible. The output pattern of the aeration device 95 can be changed merely by changing the cap. An aeration device with a cap produces a higher height output column 105 than an aeration device with a cross hatch 81, although the output volume may be slightly reduced. In all other respects, the operation and construction of the aeration device 95 are identical with that of the aeration device 75 with the cross hatch.

Thus, it is apparent that there has been provided, in accordance with the present invention, aeration apparatus that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A device for aerating water comprising:
   a. an electric motor having an output shaft for rotating about a generally vertical axis;
   b. a propeller tube having a lower end and an upper end and a central axis;
   c. bracket means for joining the propeller tube to the motor;
   d. float means connected to the propeller tube for suspending the device in a body of water;
   e. a propeller mounted to the motor shaft and surrounded by the lower end of the propeller tube, the propeller creating an output stream of water within the propeller tube when the motor shaft rotates;
   f. a diffuser plate;
   g. extension means attached to the motor shaft for retaining the diffuser plate in the propeller tube and in the path of the water output stream; and
   h. cap means mounted to the propeller tube upper end for directing the output stream of water from the propeller into a generally vertical column.

2. The device of claim 1 wherein the extension means comprises:
   a. a screw having a shank and a head and being threaded into the end of the motor shaft and generally coaxial therewith; and
   b. a nut threaded unto the screw and tightened against the end of the motor shaft with the propeller interposed therebetween, the diffuser plate being guided for longitudinal sliding within the propeller tube along the shank of the screw between the nut and the screw head in response to the water output stream created by the propeller.

3. The device of claim 1 wherein the diffuser plate comprises a disk having an axial hole therethrough that freely receives the extension means,
   so that the disk is slidable along the extension means within the propeller tube in response to the water output stream created by the propeller.

4. The device of claim 3 wherein:
   a. the propeller tube is formed as a hollow cylinder; and
   b. the diameter of the disk is approximately 75% of the inner diameter of the propeller tube.

5. The device of claim 1 further comprising guard means for surrounding the motor shaft to prevent entanglement thereof by weeds and other debris in the water.

6. The device of claim 1 further comprising:
   a. a support tube coaxial with the motor shaft and surrounding a portion thereof;
   b. an upper tube received in the support tube, the support tube and upper tube cooperating to surround substantially all of the motor shaft; and
   c. means for retaining the support tube to the motor, so that the motor shaft is protected against entanglement by weeds and the like in the water.

7. The device of claim 6 wherein the means for retaining the support tube to the motor comprises adjustment means received in the bracket means for bearing against and locating the support tube relative to the motor shaft.

8. The device of claim 1 wherein the cap means comprises a cap that defines a plurality of openings extending therethrough for directing the water output from the propeller into a decorative pattern.

9. The device of claim 8 wherein the cap openings define respective axes that converge upwardly toward the propeller tube central axis to thereby produce a predetermined decorative pattern to the vertical column 10. An aeration device comprising:
    a. a propeller tube generally submerged in a pond and having a central axis;
    b. a motor fastened to the propeller tube and having an output shaft with a generally vertical longitudinal axis;
    c. a propeller mounted to the motor shaft for rotation therewith to create a water output stream;
    d. diffuser means mounted to the motor shaft for sliding longitudinally inside the propeller tube in response to the creation of the water output stream; and
    e. a cap mounted to the propeller tube, the cap having at least one opening therethrough for directing the water output stream into a generally vertical column outside of the propeller tube.

11. The aeration device of claim 10 further comprising at least two brackets for fastening the propeller tube to the motor, each bracket having a first end fastened to the motor and a second end joined to the propeller tube, the motor and propeller tube being spaced apart to define an inlet for water in the pond to flow to the propeller.

12. The aeration device of claim 10 wherein the diffuser means comprises:
    a. an extension extending longitudinally from the motor shaft and being generally concentric therewith;
    b. a pair of stops installed a predetermined distance apart on the extension; and
    c. diffuser plate means received on the extension for sliding longitudinally therealong between the stops in response to the creation of the water output stream, the diffuser plate means being remote from the propeller when a relatively full water output stream is created and the diffuser plate means being proximate the propeller when a relatively weak water output stream is created.

13. The aeration device of claim 10 wherein the diffuser means comprises:
    a. a screw threaded into the motor shaft and having a head and a shank;
    b. a nut threaded unto the screw; and
    c. a diffuser plate freely received over and slidable along the screw shank in response to the creation of the water output stream by the propeller.

14. The aeration device of claim 13 wherein the propeller is fastened to the motor shaft by tightening the nut against the motor shaft with the propeller interposed between the nut and the motor shaft.

15. The aeration device of claim 12 wherein the diffuser plate means comprises a thin disk having a central hole therethrough for freely receiving the extension.

16. The aeration device of claim 10 wherein:
   a. the propeller tube is formed as a hollow cylinder;
   b. the diffuser means comprises:
      i. extension means extending generally coaxially from the motor shaft; and
      ii. a circular disk slidingly received over the extension means; and
   c. the water output stream from the propeller supports the disk against gravity at a first location remote from the propeller when a full water output stream is created thereby and at a second location proximate the propeller when a weak water output stream is created thereby, the water in a weak output stream due to cavitation being redirected by the disk back to the propeller to reload the propeller and thereby enable it to recreate a full water output stream after the cause of the cavitation is removed
   so that the propeller is capable of automatically recovering from a cavitated condition.

17. The aeration device of claim 10 further comprising weed guard means substantially surrounding the motor shaft for preventing entanglement thereof by weeds and the like in the pond.

18. The aeration device of claim 10 further comprising:
   a. a support tube centered over the motor shaft; and
   b. an upper tube received in the support tube, the upper tube and support tube cooperating to substantially surround the motor shaft to thereby prevent weeds and the like in the pond from entangling the motor shaft.

19. The aeration device of claim 10 wherein the cap has a plurality of openings therethrough for directing the water output stream into a generally vertical column having a predetermined pattern.

20. The aeration device of claim 10 wherein the cap has a plurality of openings therethrough that define respective longitudinal axes, and wherein at least one of the opening axes is non-parallel with the propeller tube central axis to thereby direct the water output stream into a generally vertical column having a predetermined pattern.

21. The aeration device of claim 10 wherein:
   a. the propeller creates a water output stream in the propeller tube that is generally hollow and has a generally parabolic inner surface;
   b. the diffuser means comprises:
      i. an extension extending from and being generally coaxial with the motor shaft; and
      ii. a disk retained and guided on the extension, the disk being supported by the water output stream along the extension at an equilibrium location whereat the weight of the disk is equal to the force of the water output stream parabolic inner surface striking the disk periphery,
   so that the weak water output stream of a cavitating propeller causes the disk to slide on the extension toward the propeller and redirect the water output stream back to the propeller and thereby reload the propeller to recreate a strong water output stream without external intervention after the cause of cavitation has been eliminated.

22. A method of aerating water comprising the steps of:
   a. submerging a propeller and a propeller tube that surrounds the propeller into the water;
   b. locating a diffuser plate in the propeller tube;
   c. rotating the propeller about a generally vertical axis to create a generally hollow water output stream;
   d. supporting the periphery of the diffuser plate with the interior surface of the hollow output stream at an equilibrium location whereat the force of the water output stream on the diffuser plate equals the weight of the diffuser plate, the water output stream flowing past the periphery of the diffuser plate and out of the propeller tube;
   e. mounting a perforated cap in the propeller tube downstream of the propeller and the diffuser plate; and
   f. directing the water output stream through the perforated cap and into a generally vertical column having a predetermined pattern.

* * * * *